US012340930B2

(12) United States Patent
Mogi et al.

(10) Patent No.: US 12,340,930 B2
(45) Date of Patent: Jun. 24, 2025

(54) MAGNETIC CORE AND TRANSFORMER

(71) Applicant: NIPPON STEEL CORPORATION, Tokyo (JP)

(72) Inventors: Hisashi Mogi, Tokyo (JP); Takahito Mizumura, Tokyo (JP); Fumiaki Takahashi, Tokyo (JP); Teruyuki Tamaki, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 965 days.

(21) Appl. No.: 17/273,142

(22) PCT Filed: Oct. 3, 2019

(86) PCT No.: PCT/JP2019/039206
§ 371 (c)(1),
(2) Date: Mar. 3, 2021

(87) PCT Pub. No.: WO2020/071512
PCT Pub. Date: Apr. 9, 2020

(65) Prior Publication Data

US 2021/0327631 A1 Oct. 21, 2021

(30) Foreign Application Priority Data

Oct. 3, 2018 (JP) ................................ 2018-187874

(51) Int. Cl.
*H01F 27/24* (2006.01)
*H01F 27/245* (2006.01)
*H01F 41/02* (2006.01)

(52) U.S. Cl.
CPC ....... *H01F 27/245* (2013.01); *H01F 41/0233* (2013.01)

(58) Field of Classification Search
CPC .. H01F 27/245; H01F 41/0233; H01F 27/346; H01F 27/38; H01F 27/2455; H01F 3/02; H01F 17/04
See application file for complete search history.

(56) References Cited

U.S. PATENT DOCUMENTS 2,909,742 A 10/1959 Lamberton
3,387,203 A * 6/1968 Munnelly .............. H03B 19/03 363/171

(Continued)

FOREIGN PATENT DOCUMENTS

CN 110391071 A * 10/2019 ........... H01F 27/245
DE 27 23 008 A1 11/1978

(Continued)

*Primary Examiner* — Tuyen T Nguyen
(74) *Attorney, Agent, or Firm* — Birch, Stewart, Kolasch & Birch, LLP

(57) ABSTRACT

The present invention provides a magnetic core and transformer which are reduced in core loss.
The magnetic core according to the present invention comprises a core member which is formed by winding first electrical steel sheets, which is ring shaped seen from a side surface, and which has one or more bent parts seen from a side surface and one or more stacks of second electrical steel sheets stacked together, each the stack being arranged at least at one of the surfaces formed by side surfaces of the first electrical steel sheets at a bent part of the core member so that a surface formed by side surfaces of the second electrical steel sheets runs along it.

8 Claims, 9 Drawing Sheets

(56) References Cited

U.S. PATENT DOCUMENTS

| | | | | |
|---|---|---|---|---|
| 5,069,731 | A * | 12/1991 | Yoshizawa .......... | H01F 1/15308 148/306 |
| 5,861,792 | A * | 1/1999 | Ueda ..................... | H01F 27/245 336/212 |
| 2006/0066433 | A1* | 3/2006 | Decristofaro ....... | H01F 41/0226 336/212 |

FOREIGN PATENT DOCUMENTS

| | | | |
|---|---|---|---|
| GB | 731500 | A | 6/1995 |
| JP | H08-088128 | A | 4/1996 |
| JP | 2005-38987 | A | 2/2005 |
| JP | 2017-22189 | A | 1/2017 |
| JP | 2017-157806 | A | 9/2017 |
| JP | 2018-32703 | A | 3/2018 |

* cited by examiner

MAGNETIC CORE AND TRANSFORMER

FIELD

The present invention relates to a magnetic core and a transformer.

BACKGROUND

A magnetic core is used as a core of a transformer, reactor, noise filter, etc. In a transformer, in the past, from the viewpoint of higher efficiency, reduction of the core loss had been one of the important goals. Reduction of the core loss is being studied from various perspectives.

For example, in PTL 1, a transformer comprised of a rectangular ring-shaped magnetic core comprised of a stack of electrical steel sheets and having joined parts, a winding wound around at least one of the columnar parts of the magnetic core, a pressing member pressing the columnar parts having the joined parts in the stacking direction of the electrical steel sheets, and a tension imparting member imparting tension in a circumferential direction to at least one columnar part of the magnetic core is disclosed.

Further, for example, in PTL 2, a magnetic core of a wound thickness of 40 mm or more made of a plurality of grain-oriented electrical steel sheets of ring shapes when viewed from the side stacked in a sheet thickness direction, which magnetic core comprising an inside core arranged at an inside surface side and an outside core arranged at an outside surface side of the inside core, a wound thickness of the inside core being a predetermined dimension, grain-oriented electrical steel sheets forming the inside core among the grain-oriented electrical steel sheets having a plurality of bent parts of curved shapes when viewed from the side which are formed by metal microstructures including twinning crystals, the outside core having a higher rate of occupancy of the grain-oriented electrical steel sheets than the inside core, is disclosed.

Further, for example, in PTL 3, obtaining sheet-shaped magnetic materials by cutting an electrical steel sheet into approximately trapezoidal shapes, approximately unequal side quadrilateral shapes, approximately pentagonal shapes, etc., arranging these sheet-shaped magnetic materials on a plane forming top, bottom, left, and right directions, and joining them with each other at their surfaces in the thickness direction whereby one layer of a laminated core is formed is disclosed. Further, in PTL 3, a configuration in which gaps having certain extents of widths are formed at the joined locations and the front surfaces of the gaps are covered by fastening patch-shaped magnetic materials is disclosed.

Further, for example, in PTL 4, a configuration of a separated type transformer comprised of a fixed core and a movable core in which leaking magnetic flux is prevented by fastening clamping plates around the joined parts of the fixed core and movable core is disclosed.

CITATION LIST

Patent Literature

[PTL 1] Japanese Unexamined Patent Publication No. 2018-32703

[PTL 2] Japanese Unexamined Patent Publication No. 2017-157806

[PTL 3] Japanese Unexamined Patent Publication No. 2017-22189

[PTL 4] Japanese Unexamined Patent Publication No. 2005-38987

SUMMARY

Technical Problem

However, the lower the core loss the better. There is still room for improvement in the conventional magnetic cores such as described in PTL 1 and PTL 2. On the other hand, in the arts described in PTL 3 and PTL 4, plate-shaped members are attached to the joined locations of the cores so as to prevent leakage of magnetic flux. However, with such a technique, eddy current loss occurs at the plate-shaped members, so there is the problem that the core loss cannot be suppressed.

Therefore, the present invention was made in consideration of the above problem. The object of the present invention is to provide a magnetic core and transformer which are reduced in core loss.

Solution to Problem

To solve the above problem, the inventors engaged in intensive studies and took note of the core loss due to bent parts at the magnetic core. That is, at the bent parts, the magnetic permeability falls and the core loss increases. Further, at these parts, leakage flux occurs and the eddy current caused due to this leakage flux causes the core loss to increase. The inventors discovered that by providing new magnetic paths at the side surfaces of the curved parts or angle parts in the magnetic core for the purpose of suppressing core loss at such bent parts, the leakage flux is suppressed and that by suppressing the eddy current generated at parts other than the magnetic paths, the core loss is reduced. They engaged in further studies and as a result reached the present invention.

The gist of the present invention completed based on the above findings is as follows:

(1) A magnetic core comprising
- a core member which is formed by winding first electrical steel sheets, which is ring shaped seen from a side surface, and which has one or more bent parts seen from a side surface and
- one or more stacks of second electrical steel sheets stacked together,
- each stack being arranged at least at one of the surfaces formed by side surfaces of the first electrical steel sheets at a bent part of the core member so that a surface formed by side surfaces of the second electrical steel sheets runs along it.

(2) The magnetic core according to (1), where a direction of stacked surfaces of the second electrical steel sheets of the stack runs along a direction of stacked surfaces of the first electrical steel sheets of the core member.

(3) The magnetic core according to (1) or (2), where an angle of stacked surfaces of the second electrical steel sheets to a line connecting a center point of an inner circumference part of a bent part and a center point of an outer circumference part of a bent part at least at one of the side surfaces when viewing the core member from the direction running along the surface of the first electrical steel sheets is 45 degrees or more and 90 degrees or less.

(4) The magnetic core according to any one of (1) to (3), where the core member has an angle part when viewing the core member from a side surface.

(5) The magnetic core according to any one of (1) to (4), where a shape of the core member when viewing the core member from a side surface is an octagonal shape.

(6) The magnetic core according to any one of (1) to (5), where a thickness of the second electrical steel sheets is the same as a thickness of the first electrical steel sheets or smaller than a thickness of the first electrical steel sheets.

(7) The magnetic core according to (6), where when the thickness of the first electrical steel sheets is $T_1$ and the thickness of the second electrical steel sheets is $T_2$, a ratio of $T_2/T_1$ is 0.5 or more and 1.0 or less.

(8) The magnetic core according to any one of (1) to (7), where the second electrical steel sheets are insulated from each other.

(9) A transformer comprising a core member which is formed by winding first electrical steel sheets, which is ring shaped seen from a side surface, and which has one or more bent parts seen from a side surface and one or more stacks of second electrical steel sheets stacked together, each stack being arranged at least at one of the surfaces formed by side surfaces of the first electrical steel sheets at a bent part of the core member so that a surface formed by side surfaces of the second electrical steel sheets runs along it.

Advantageous Effects of Invention

According to the present invention, it is possible to provide a magnetic core and transformer which are reduced in core loss.

BRIEF DESCRIPTION OF DRAWINGS

FIG. 3 is a partial enlarged plan view showing part of a side surface of the core member for explaining one example of the arrangement of the core member and a stack which the magnetic core shown in FIG. 1 is provided with.

FIG. 4 is an explanatory view for explaining the arrangement of a stack which the magnetic core shown in FIG. 1 is provided with.

FIG. 5 is a disassembled perspective view showing one example of a method of attachment of a stack which the magnetic core shown in FIG. 1 is provided with.

DESCRIPTION OF EMBODIMENTS

Below, preferred embodiments of the present invention will be explained in detail while referring to the attached drawings. Note that, in this Description and the drawings, component elements having substantially the same functions and configurations will be assigned the same reference notations and overlapping explanations will be omitted. Further, the ratios and dimensions of the component elements in the figures do not express the actual ratios and dimensions of the component elements.

1. Magnetic Core and Transformer

Figure 1:
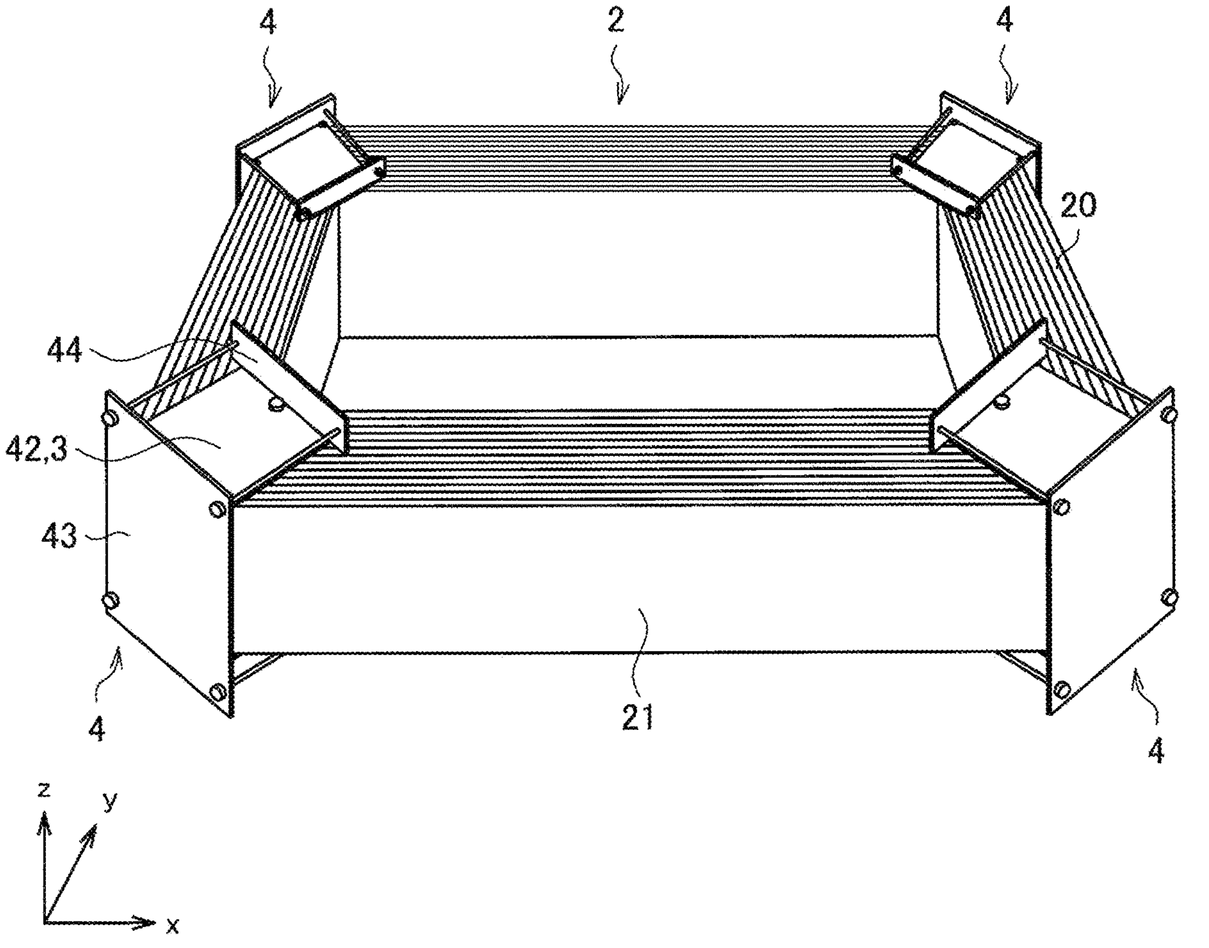
FIG. 1 is a perspective view showing one example of a magnetic core according to one embodiment of the present invention.
Figure 2:
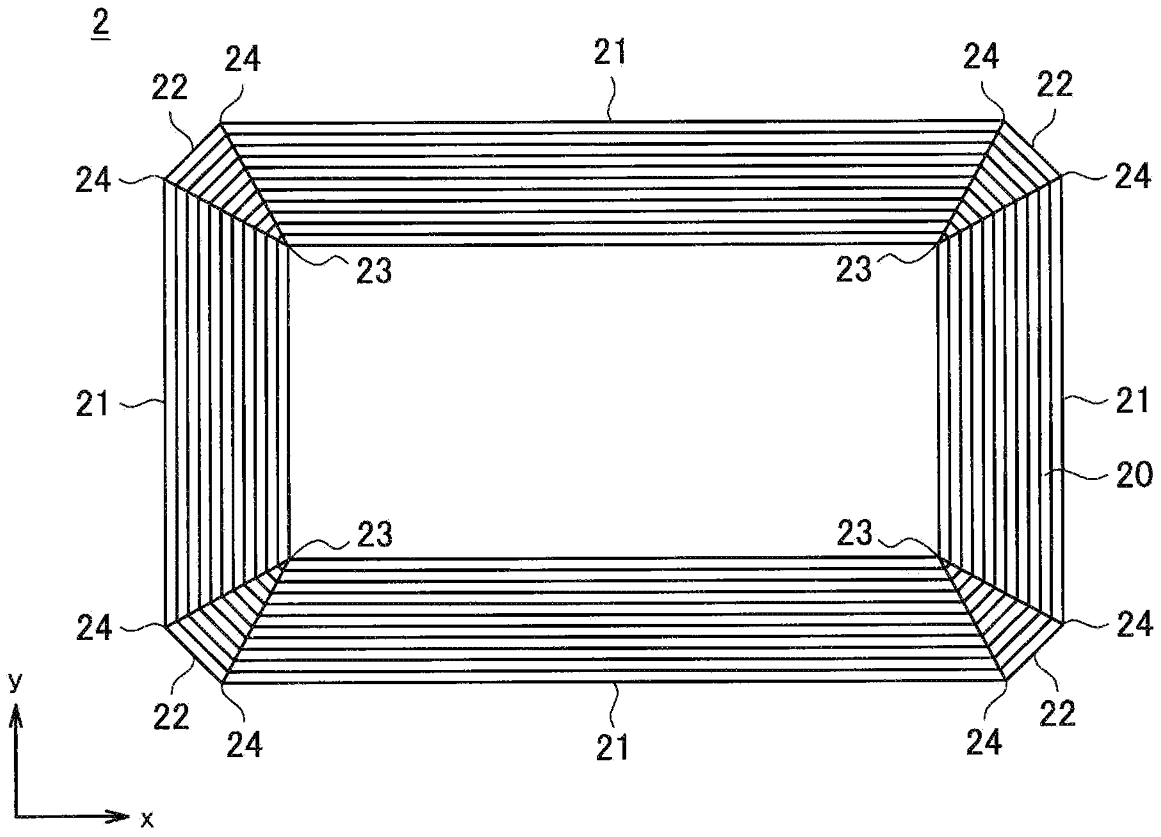
FIG. 2 is a plan view showing a core member which the magnetic core shown in FIG. 1 is provided with from a side surface side of electrical steel sheets.
Figure 3:
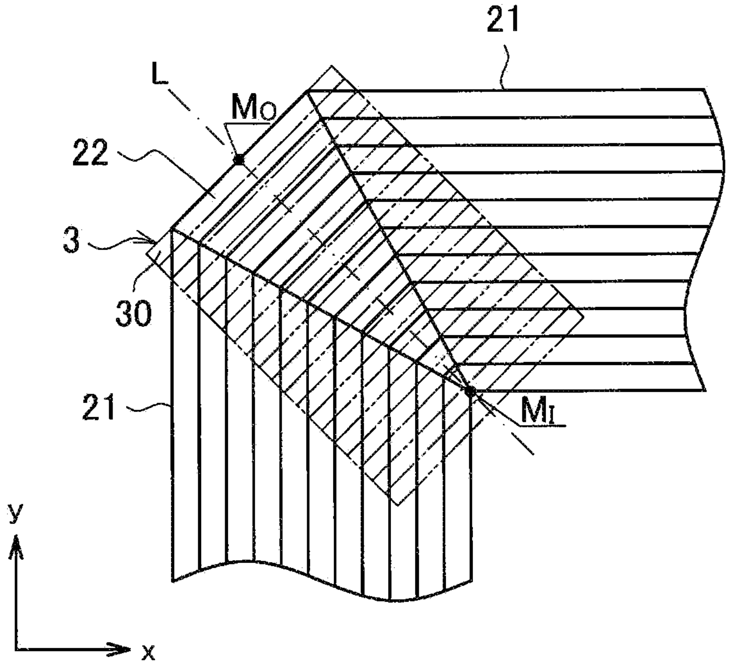
Figure 4:
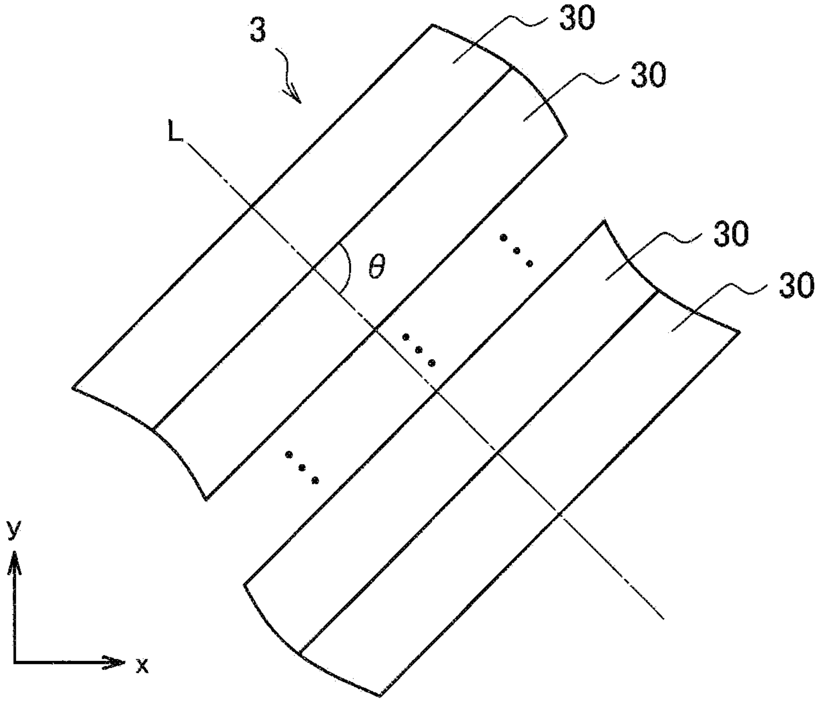

First, referring to FIG. 1 to FIG. 4, the magnetic core and transformer according to one embodiment of the present invention will be explained. FIG. 1 is a perspective view showing one example of a magnetic core according to one embodiment of the present invention. FIG. 2 is a plan view showing a core member which the magnetic core shown in FIG. 1 is provided with from a side surface side of the electrical steel sheets. FIG. 3 is a partial enlarged plan view showing part of a side surface of the core member for explaining one example of the arrangement of the core member and a stack which the magnetic core shown in FIG. 1 is provided with. FIG. 4 is an explanatory view for explaining the arrangement of a stack which the magnetic core shown in FIG. 1 is provided with.

The magnetic core 1 according to the present embodiments is provided with a core member 2 which is formed by winding first electrical steel sheets 20, which is ring shaped seen from a side surface, and which has one or more bent parts 22 seen from a side surface and one or more stacks 3 of second electrical steel sheets 30 stacked together. A stack 3 is arranged at least at one of the side surfaces of the first electrical steel sheets 20 at the core member 2 so that the surface formed by the side surface of the second electrical steel sheet 30 in the stack 3 follows along the surface formed at the side surface of the first electrical steel sheets 20 at the bent part 22. The magnetic core 1, as shown in FIG. 2, is formed as an octagon overall. In the present embodiment, the magnetic core 1 is provided with a core member 2, stacks 3, and jigs 4.

As shown in FIG. 2, the core member 2 is a wound member formed by winding strip-shaped first electrical steel sheets 20 and has one or more bent parts 22. Specifically, the core member 2 forms a rectangular shape by the side surfaces of the first electrical steel sheets 20 bent to form four corner parts 23 at the innermost circumference. The outer circumference first electrical steel sheets 20 are bent at the corner parts 23 of the innermost circumference first electrical steel sheets 20 and wound so that two angle parts 24 are formed. As a result, when viewed from a side surface side of the first electrical steel sheets 20, the core member 2 forms an octagonal shape having eight angle parts 24 at its outer circumference. On the other hand, it forms a rectangular shape having four corner parts 23 at its inner circumference. Further, the core member 2 is comprised of straight shaped side parts 21 running along the straight parts of the innermost circumference first electrical steel sheets 20 and four bent parts 22 each having a corner part 23 at its innermost circumference and two angle parts 24 formed at the outer circumference side of the corner part 23.

The thickness of the first electrical steel sheets 20 may, for example, be made 0.20 mm or more and 0.40 mm or less. By using electrical steel sheets with a thin thickness as the first electrical steel sheets 20, it becomes harder for an eddy current to form inside the plane of sheet thickness of the first electrical steel sheets 20 and the eddy current loss in the core loss can be reduced. As a result, the core loss of the magnetic core 1 can be reduced more. The thickness of the first electrical steel sheets 20 is preferably 0.18 mm or more and 0.35 mm or less, more preferably is 0.18 mm or more and 0.27 mm or less.

For the first electrical steel sheets 20, for example, existing grain-oriented electrical steel sheets or existing non-oriented electrical steel sheets can be used. Preferably, the first electrical steel sheets 20 are grain-oriented electrical steel sheets. By using grain-oriented electrical steel sheets for the core member, it becomes possible to reduce the hysteresis loss in the core loss and becomes possible to reduce the core loss of the magnetic core 1 more.

The wound layers of the first electrical steel sheets 20 are preferably insulated from each other. For example, the surfaces of the first electrical steel sheets 20 are preferably treated to make them insulating. By the layers of the first electrical steel sheets 20 being insulated, it becomes harder for an eddy current to form inside the plane of sheet thickness of the first electrical steel sheets 20 and the eddy current loss can be reduced. As a result, the core loss of the magnetic core 1 can be reduced more. For example, the surfaces of the first electrical steel sheets 20 are preferably treated to make them insulating using an insulating coating solution containing colloidal silica and a phosphate.

Each stack 3 is formed by stacking a plurality of sheet-shaped second electrical steel sheets 30. The stack 3 is arranged at least at one surface of the side surfaces of a bent part 22 so that the side surfaces of the second electrical steel sheets 30 of the stack 3 contact and run along the side surfaces of the first electrical steel sheets 20 of the bent part 22 while maintaining insulation. The magnetic flux running through the core member 2 easily leaks from the parts of the bent part 22 where the first electrical steel sheets 20 are bent. The more the first electrical steel sheets 20 are bent, the easier it is for the magnetic flux to leak. In the core member 2 shown in FIG. 2, the first electrical steel sheets 20 are greatly bent at the straight part connecting the corner part 23 and an angle part 24, so the magnetic flux running through the core member 2 easily leaks at that part. However, the stack 3 is arranged at least at one surface of the side surfaces of the bent part 22 so that the side surfaces of the second electrical steel sheets 30 of the stack 3 run along the side surfaces of the first electrical steel sheets 20 of the bent part 22, so the leakage flux occurring at the bent part 22 can run from one side part 21 through the stack 3, then run through the other side part 21 connected to the stack 3. As a result, it becomes possible to reduce the core loss occurring at the magnetic core 1. In particular, by the stack 3 being arranged at the two sides of the bent part 22, as shown in FIG. 1, the core loss can be reduced much more.

Each stack 3 and the core member 2 are preferably insulated from each other. For example, an insulating sheet is preferably placed between the stack 3 and the core member 2. As the material of the insulating sheet, natural rubber, an epoxy resin, polyvinyl chloride, a polyurethane insulating material or other various known insulators can be used.

The magnetic core 1, as shown in FIG. 4, in the present embodiment, is arranged so that the angle θ of the stacked surfaces of the second electrical steel sheets 30 at the stack 3 with respect to the line L connecting the center point $M_I$ of the inner circumference of the side surface at the bent part 22 and the center point $M_O$ of the outer circumference of the side surface at the bent part 22 becomes 45 degrees or more and 90 degrees or less. By the angle θ becoming 45 degrees or more and 90 degrees or less, the second electrical steel sheets 30 become magnetic paths for the leakage flux generated at the bent part 22, so the eddy current generated at parts other than the magnetic paths is suppressed much more. More preferably, the angle of the stacked surfaces of the electrical steel sheets at the stack is 75 degrees or more and 90 degrees or less.

Each stack 3, for example, in FIG. 3, is arranged so that the stacked surfaces of the second electrical steel sheets 30 become 90 degrees with respect to the line L. Due to this, the second electrical steel sheets 30 become magnetic paths for the leakage flux generated at a bent part 22, so the eddy current generated at parts other than the magnetic paths is suppressed much more. As a result, the core loss is reduced.

The thickness $T_2$ of the second electrical steel sheets 30 is not particularly limited. However, the thickness $T_2$ of the second electrical steel sheets 30 may be made the same as the thickness $T_1$ of the first electrical steel sheets 20 or may be made less than the thickness $T_1$ of the first electrical steel sheets 20. By making the thickness $T_2$ of the second electrical steel sheets 30 less than the thickness $T_1$ of the first electrical steel sheets 20, the leakage flux occurring at a bent part 22 of the core member 2 passes through the stack 3 much more efficiently. Further, by making the thickness $T_2$ of the second electrical steel sheets 30 of the stack 3 the same as the thickness $T_1$ of the first electrical steel sheets 20 of the core member 2 or thinner than the thickness $T_1$ of the first electrical steel sheets 20 of the core member 2, the eddy current loss becomes smaller and the loss at the stack 3 is kept down. Due to this, it becomes possible to reduce the eddy current loss occurring due to leakage flux much more. As a result, the core loss of the magnetic core 1 can be reduced more. Therefore, preferably the ratio $T_2/T_1$ of the thickness $T_2$ of the second electrical steel sheets 30 to the thickness $T_1$ of the first electrical steel sheets 20 is 1.0 or less. On the other hand, if considering the range of sheet thickness which can be manufactured, the lower limit of $T_2/T_1$ becomes 0.5 or so.

Figure 13:
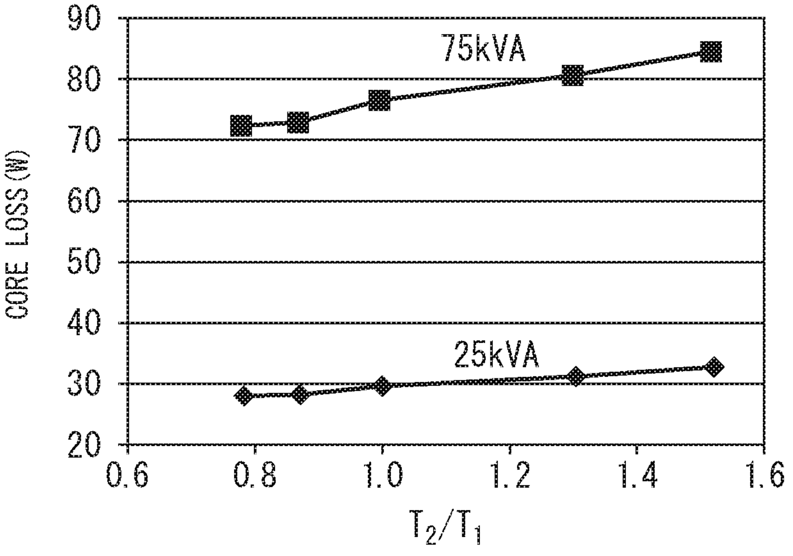
FIG. 13 is a graph showing a relationship between a ratio $T_2/T_1$ of a thickness $T_2$ of the second electrical steel sheets to a thickness $T_1$ of the first electrical steel sheet and a core loss of a core member.

FIG. 13 is a graph showing the relationship between the ratio $T_2/T_1$ of the thickness $T_2$ of the second electrical steel sheets 30 with respect to the thickness $T_1$ of the first electrical steel sheets 20 and the core loss of the core member 2. In FIG. 13, the characteristics when using the magnetic core 1 according to the present embodiment to manufacture 25 kVA and 75 kVA transformers are shown. As shown in FIG. 13, in both of the 25 kVA and 75 kVA transformers, the results were obtained that the smaller the ratio $T_2/T_1$ of the thickness $T_2$ of the second electrical steel sheets 30 with respect to the thickness $T_1$ of the first electrical steel sheets 20, the more the core loss fell. Therefore, the value of $T_2/T_1$ preferably is made as small as possible. If $T_2/T_1$ becomes 1.0 or less, compared to when $T_2/T_1$ is larger than 1.0, the ratio by which the core loss falls along with the fall of $T_2/T_1$ becomes larger. In a 75 kVA transformer, this tendency appears more remarkably. Therefore, as explained above, the ratio $T_2/T_1$ of the thickness $T_2$ of the second electrical steel sheets 30 with respect to the thickness $T_1$ of the first electrical steel sheets 20 is preferably 1.0 or less.

Further, the second electrical steel sheets 30 may be electrical steel sheets the same as or different from the first electrical steel sheets 20. Specifically, as the second electrical steel sheets 30, for example, existing grain-oriented electrical steel sheets or existing non-oriented electrical steel sheets can be used. Preferably, the second electrical steel sheets 30 are grain-oriented electrical steel sheets. By using grain-oriented electrical steel sheets for the stacks 3, it becomes possible to reduce the hysteresis loss in the core loss and as a result it becomes possible to reduce more the core loss of the magnetic core 1.

The second electrical steel sheets 30 are preferably insulated. For example, the surfaces of the electrical steel sheets are preferably treated for insulation. By the stacked layers of the second electrical steel sheets 30 being insulated, eddy current becomes reliably more difficult to form inside the plane of sheet thickness of the second electrical steel sheets 30 and the eddy current loss can be reduced more. As a result, the core loss of the magnetic core 1 can be reduced more. For example, the surfaces of the second electrical steel sheets 30 are preferably treated to make them insulating using an insulating coating solution containing colloidal silica and a phosphate.

Note that, each stack 3 may in accordance with need have through holes running through the stack 3 from a side surface. The through holes have bolts of the jig 4 or other fasteners inserted through them so as to fasten the stack 3 to the core member 2.

Figure 5:
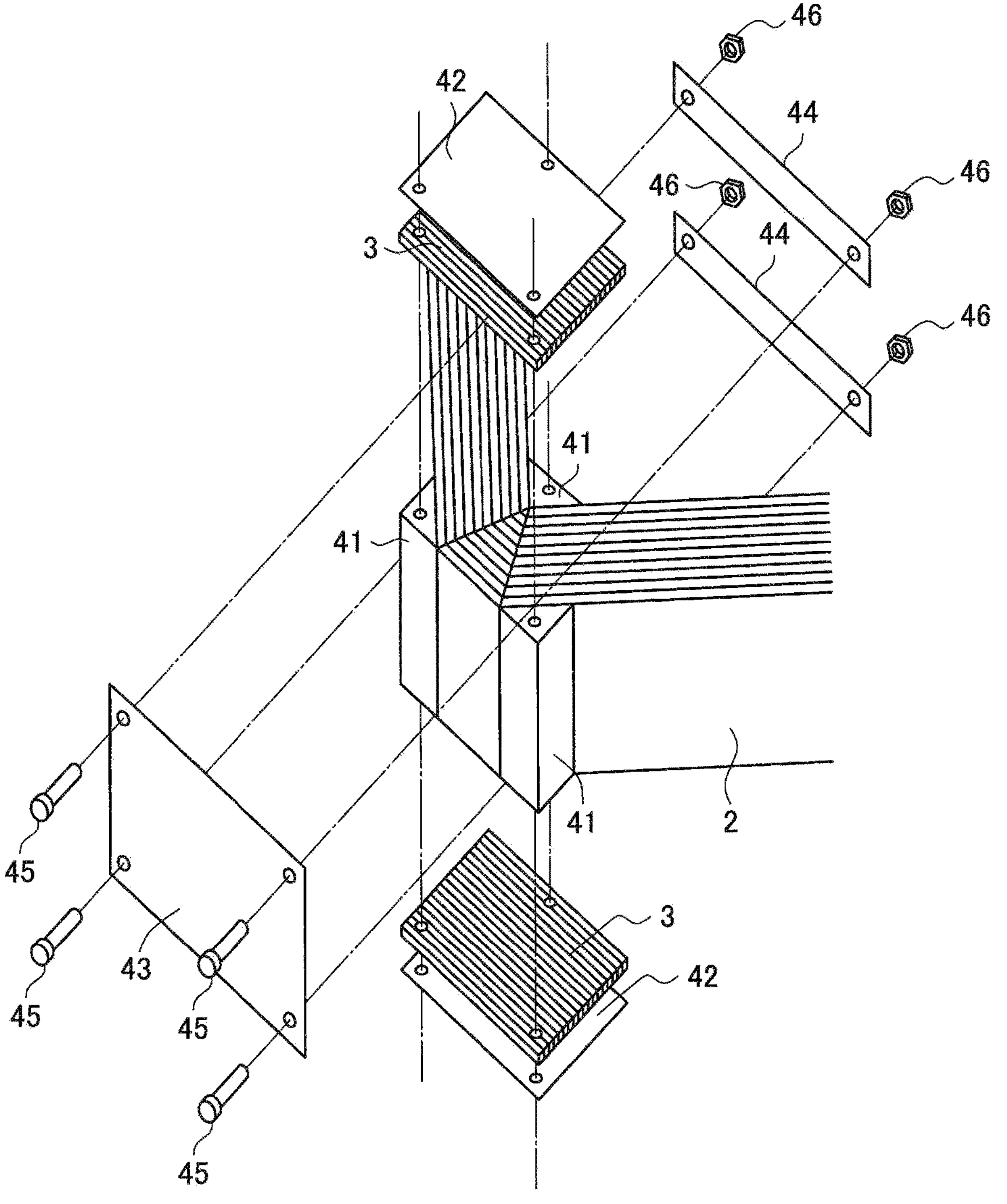

A jig 4 is provided around a bent part 22 and fastens the stack 3 to the core member 2. Here, referring to FIG. 5, one example of the jig 4 according to the present embodiment will be explained. FIG. 5 is a disassembled perspective view showing one example of a method of attaching a stack which the magnetic core shown in FIG. 1 is provided with. The jig 4, as shown in FIG. 5, has support columns 41, fastening plates 42, an outer plate 43, inner plates 44, bolts 45, and nuts 46.

As shown in FIG. 5, at the outer circumference side and inner circumference side of the bent part 22, supports 41 for supporting the stack 3 are arranged. Further, fastening plates 42 arranged so as to clamp the bent part 22 and the stack 3 between them, an outer plate 43 arranged at the outer circumference side of the core member 2, and an inner plate 44 arranged at the inner circumference side of the core member 2 are used to fasten the stack 3 to the bent part 22. The stack 3 has through holes through which the bolts 45 are inserted. The support columns 41 and fastening plates 42 respectively have through holes at positions corresponding to the through holes of the stack 3. The bolts 45 are inserted in the through holes of the stack 3, the through holes of the support columns 41, and the through holes of the fastening plates 42, then the nuts 46 are fastened to the tips of the bolts 45. The outer plate 43 and the inner plates 44 have respectively corresponding pluralities of through holes in the plate width directions. The bolts 45 are inserted in these corresponding through holes while the nuts 46 are fastened to the tips of the bolts 45.

Note that, for the bolts 45, ones with at least surfaces treated for insulation can be used. For example, for the bolts 45, ones using insulators such as ceramics can be used. Due to this, due to the bolts 45, the stacks 3 are fastened to the side surfaces of the core member 2 without the core member 2 and the stacks 3 being conductively connected.

Further, the material of the bolts 45 is preferably nonmagnetic. By making the material of the bolts 45 nonmagnetic, leakage flux can be prevented from entering the bolts 45 and an eddy current generated.

Figure 8:
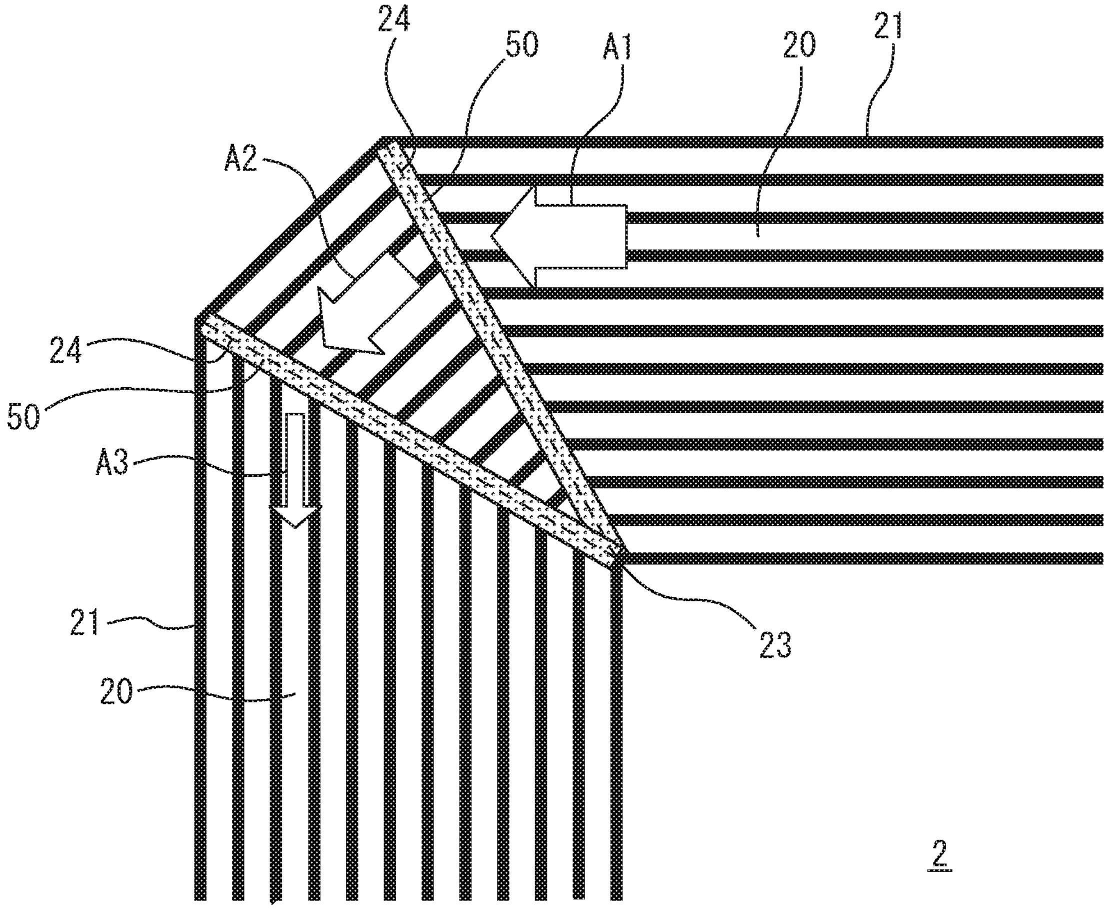
FIG. 8 is a schematic view showing the manner by which magnetic flux runs through the core member in the case where no stack is provided.

Next, based on FIG. 8 to FIG. 10, the action caused by the provision of a stack 3 comprised of a plurality of sheet-shaped second electrical steel sheets 30 stacked together will be explained. FIG. 8 is a schematic view showing the manner by which magnetic flux runs through the core member 2 when not providing the stack 3.

The first electrical steel sheets 20 of the core member 2 are bent at the positions of the angle parts 24. Strain occurs at the positions of the angle parts 24. Therefore, as shown in FIG. 8, strain regions 50 are formed at the core member 2 along the positions of the two angle parts 24. The arrow mark A1, arrow mark A2, and arrow mark A3 shown in FIG. 8 schematically show the manner in which the magnetic flux leaks when magnetic flux runs through the strain regions 50. Further, the thicknesses of the arrow mark A1, arrow mark A2, and arrow mark A3 show the magnitudes of the magnetic flux. As shown in FIG. 8, when magnetic flux passes through the strain regions 50, magnetic flux leaks whereby the magnetic flux becomes smaller in magnitude and core loss occurs.

Figure 9:
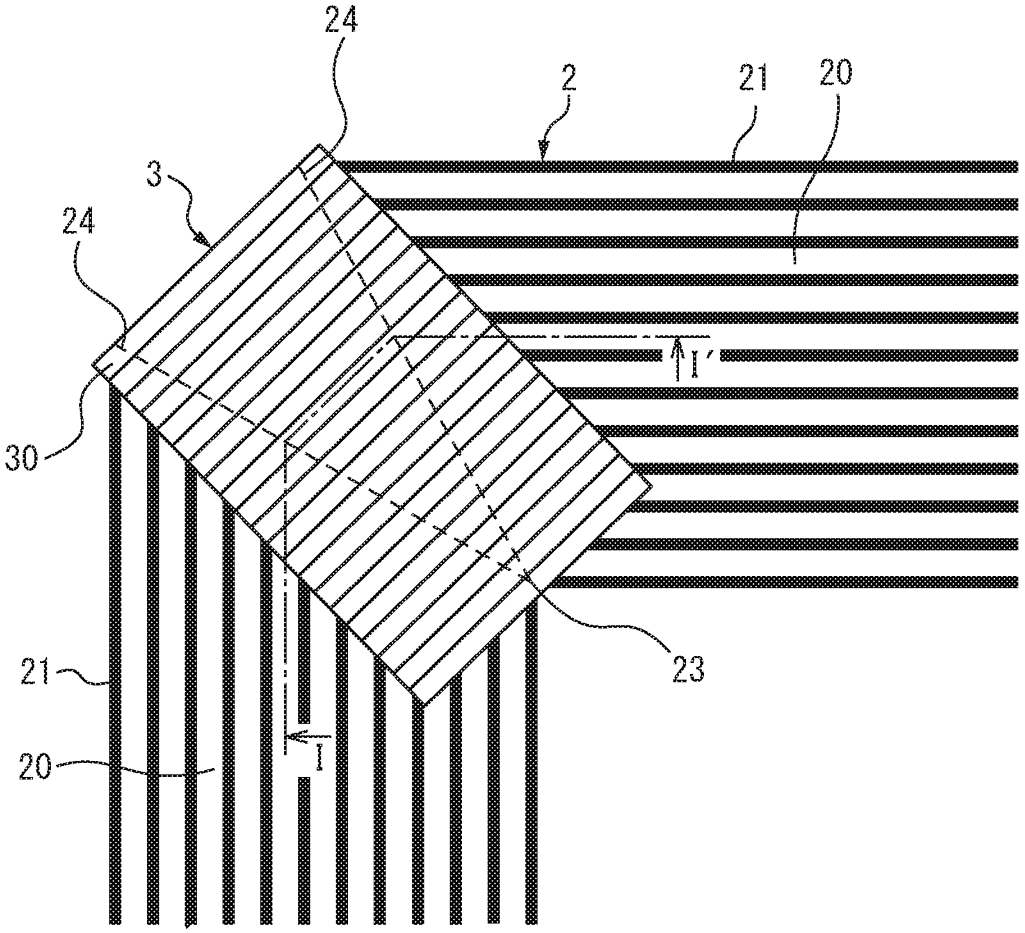
FIG. 9 is a schematic view showing the state of arrangement of a stack so as to cover strain regions compared with FIG. 8.

FIG. 9 shows the state where a stack 3 is placed so as to cover the strain regions 50 compared with FIG. 8. Further, FIG. 10 is a view showing a cross-section along the one-dot chain line I-I' shown in FIG. 9 and a schematic view schematically showing the manner by which magnetic flux passes through the cross-section along the one-dot chain line I-I'. In FIG. 10, the flow of the magnetic flux is shown by the arrow marks. As shown in FIG. 10, the strain regions 50 corresponding to the angle parts 24 are covered by the stack 3, whereby at the positions of the angle parts 24, the magnetic flux runs through the stack 3 at those positions.

Figure 10:
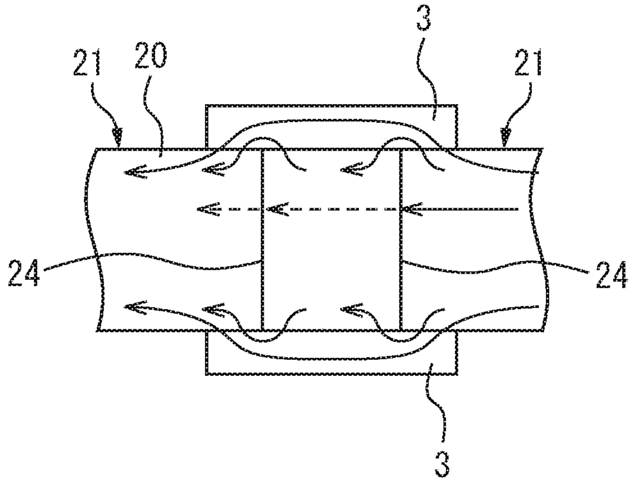
FIG. 10 is a view showing a cross-section along a one-dot chain line I-I' shown in FIG. 9 and a schematic view showing the manner of the magnetic flux running through the cross-section along the one-dot chain line I-I'.

Specifically, as shown in FIG. 10, when magnetic flux passes through the angle parts 24, leakage flux occurs at the positions of the angle parts 24, but the leakage flux runs from one side part 21 of the core member 2 through the stack 3 and runs through the other side part 21 connected to that stack 3. That is, the leakage flux generated when magnetic flux runs through the strain regions 50 of the angle parts 24 is trapped by the stack 3, then passes through the stack 3 and is returned to the core member 2.

Further, a stack 3 is formed by a plurality of sheet-shaped second electrical steel sheets 30 stacked together. Preferably, the adjoining second electrical steel sheets 30 are insulated from each other. Therefore, the eddy current loss when magnetic flux passes through the stack 3 is suppressed. Due to this, the core loss of the magnetic core 1 is reduced. Note that, in FIG. 10, the example was shown where stacks 3 were arranged at the two side surfaces of the core member 2, but a stack 3 may also be arranged at least one of the side surfaces of the core member 2.

On the other hand, if using a continuous single piece of a metal sheet of a shape similar to the stack 3 instead of this stack 3, arranging the metal sheet at a side surface of the core member 2 would result in short-circuiting of the stacked surfaces of the first electrical steel sheets 20 and the insulation between the first electrical steel sheets 20 would no longer be maintained. Therefore, a large eddy current flows to the cross-section of the first electrical steel sheets 20 and the loss (eddy current loss) increases. Even if insulating the metal sheets from the core member 2, the magnetic flux would run through the large cross-section of the metal sheets, so the eddy current loss would end up increasing.

According to the present embodiment, a stack 3 is formed by a plurality of sheet-shaped second electrical steel sheets 30 stacked together, the magnetic flux runs through a smaller cross-section by the second electrical steel sheets 30 of the stack 3 being insulated from each other, and the eddy current loss is reliably lowered. Therefore, the core loss of the magnetic core 1 is reduced.

Next, based on FIG. 11 and FIG. 12, variations of the shape of the stack 3 will be explained. In FIG. 3, a rectangular shaped stack 3 was shown, but the stack 3 may also be made a triangular shape having the corner part 23 of the first electrical steel sheets 20 as its apex and having angle parts 24 as its sides and a substantially V-shape covering the regions including the circumferential sides.

Figure 11:
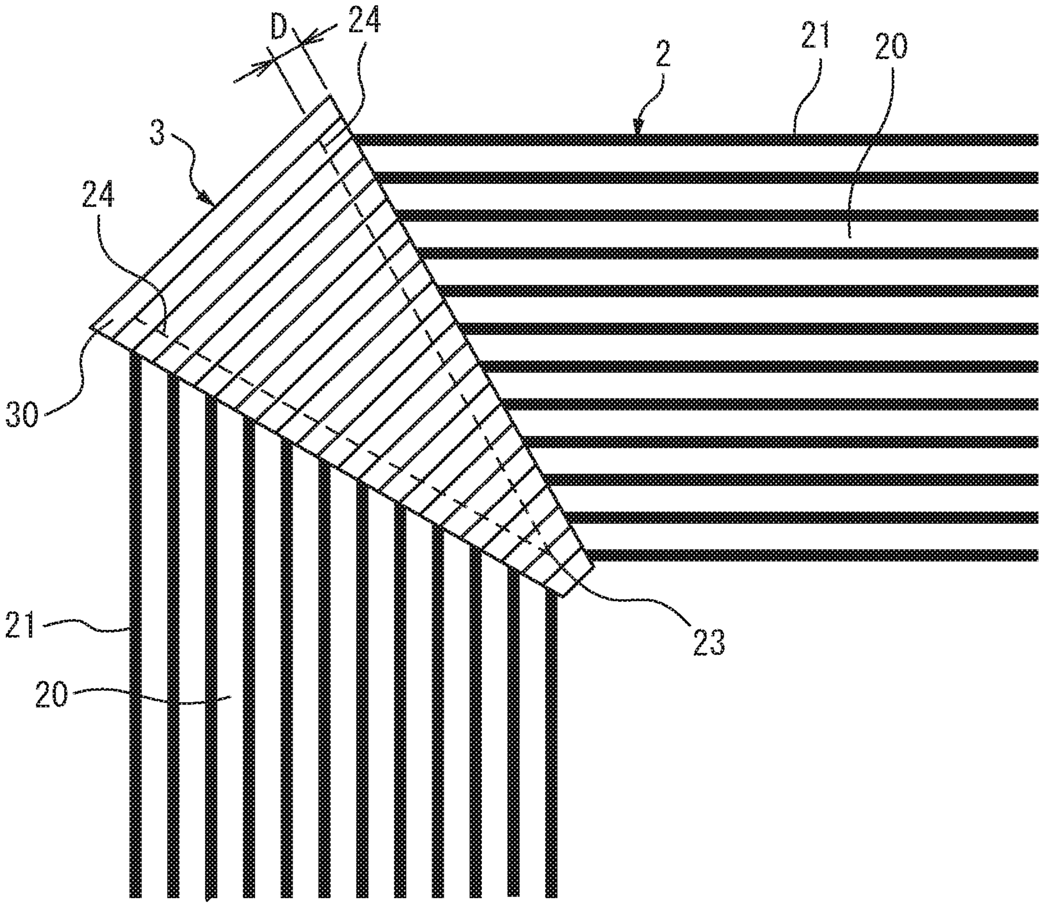
FIG. 11 is a schematic view showing an example of a region at a side part side of a rectangular stack shown in FIG. 3 cut at a position at the outside from the angle part.

FIG. 11 is a schematic view showing an example of regions of the side part 21 sides of the rectangular shaped stack 3 shown in FIG. 3 cut at positions at the outsides from the angle parts 24. The end parts of the two side part 21 sides of the stack 3 are offset from the angle parts 24 by exactly the predetermined distances D. The leakage flux is trapped at the regions of the predetermined amounts D at the side part 21 sides from the angle parts 24. Note that, the larger the predetermined amounts D is made, the more reliably the leakage flux is trapped, but the area of the stack 3 increases, so the manufacturing cost of the stack 3 increases.

Figure 12:
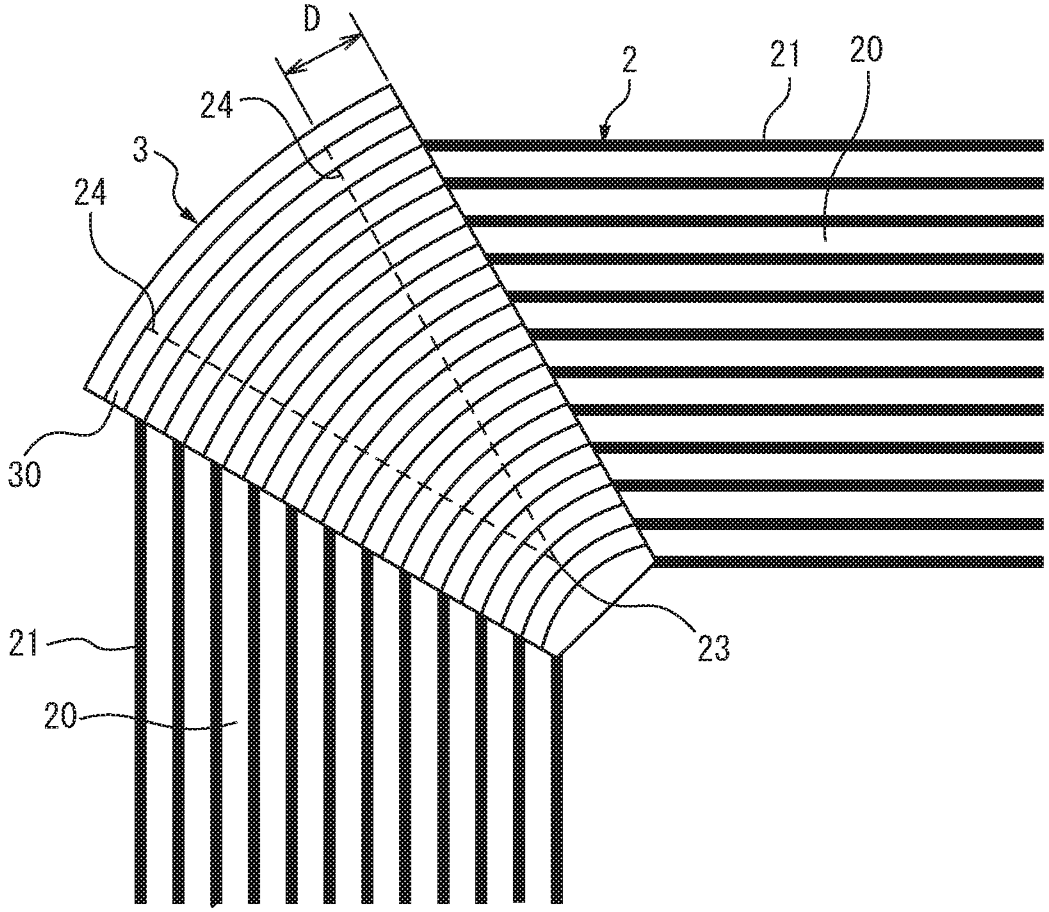
FIG. 12 is a schematic view showing an example of second electrical steel sheets forming a stack rendered into arc shapes.

Further, FIG. 12 is a schematic view showing an example of making the second electrical steel sheets 30 forming the stack 3 into arc shapes. In the example shown in FIG. 12 as well, the end parts of the two side part 21 sides of the stack 3 are offset from the angle parts 24 by predetermined amounts D. By making the second electrical steel sheets 30 arc shapes, at the regions of the side part 21 sides from the angle parts 24, the second electrical steel sheets 30 extend in directions along the first electrical steel sheets 20 more. In other words, compared with FIG. 3 and FIG. 11, in the configuration of FIG. 12, at the regions of the side part 21 sides from the angle parts 24, the directions of the second electrical steel sheets 30 approach the directions of the first electrical steel sheets 20 more. Therefore, the stack 3 can more reliably trap leakage flux.

Due to the above, according to the present embodiment, it becomes possible to reduce the core loss occurring at the magnetic core 1. Further, according to the magnetic core 1 according to the present embodiment, it becomes possible to keep down the noise of a transformer manufactured using the magnetic core 1. That is, a stack 3 is arranged at least at one surface among the side surfaces of a bent part 22 so that the side surfaces of the second electrical steel sheets 30 of the stack 3 run along the side surfaces of the first electrical steel sheets 20 of the bent part 22. Therefore, and the leakage flux generated at the bent part 22 can run from one side part 21 through the stack 2, then run through the other side part 21 connected to that stack 3. As a result, it becomes possible to reduce the noise generated at the magnetic core 1.

The magnetic core according to the present embodiment can be applied to a transformer. The transformer according to the present embodiment is provided with a magnetic core according to the present embodiment, a primary winding, and a secondary winding. By an alternating current voltage being applied to the primary winding, magnetic flux is generated at the magnetic core according to the present embodiment. Due to the change in the magnetic flux generated, voltage is applied to the secondary winding. A stack which the magnetic core has is arranged at least at one of the side surfaces of a bent part so that the side surfaces of the second electrical steel sheets of the stack run along the side surfaces of the first electrical steel sheets of the bent part, so leakage of the magnetic flux generated at the magnetic core according to the present embodiment to the outside of the magnetic core is suppressed. As a result, it becomes possible to reduce the core loss occurring in the magnetic core and further becomes possible to suppress noise of the transformer.

2. Modifications

Above, an embodiment of the present invention was explained. Below, several modifications of the above embodiment of the present invention will be explained. Note that, the modifications explained below may be applied to the above embodiment of the present invention independently or may be applied to the above embodiment of the present invention combined. Further, the modifications may be applied in place of the configurations explained in the above embodiment of the present invention or may be applied additionally to the configurations explained in the above embodiment of the present invention.

Figure 6:
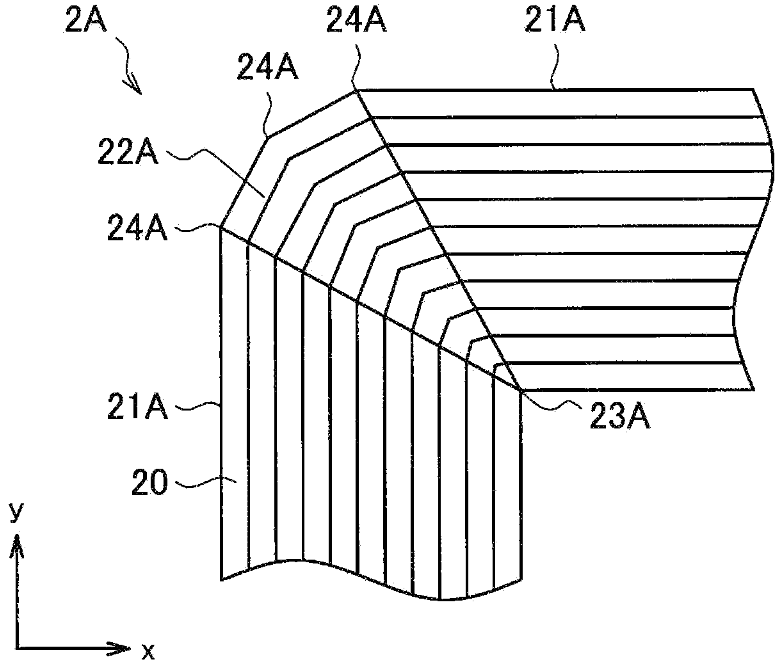
FIG. 6 is an enlarged plan view showing part of a side surface of the core member for explaining another example of a bent part in the core member according to the present embodiment.
Figure 7:
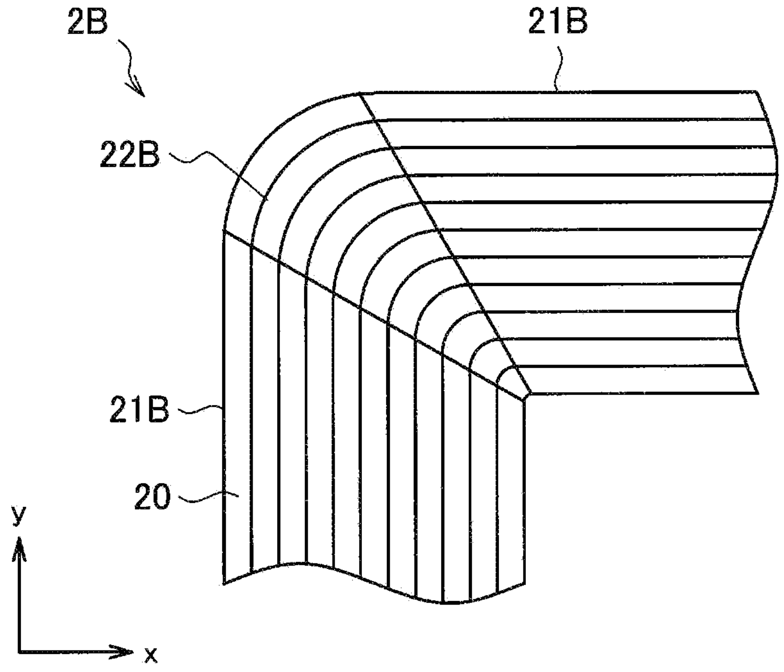
FIG. 7 is an enlarged plan view showing part of a side surface of the core member for explaining another example of a bent part in the core member according to the present embodiment.

In the above-mentioned embodiment, the case where the outer circumference of a side surface of the core member was an octagonal shape was explained, but the present invention is not limited to this. The outer circumference of the side surface of the core member may be made a polygonal shape, rounded square shape, oval shape, oblong shape, etc. In this case, a bent part is positioned between one side part and another side part adjoining each other and is a part where the first electrical steel sheets are stacked bent with respect to the directions of extension of first electrical steel sheets at one side part and first electrical steel sheets at the other side part. Referring to FIG. 6 and FIG. 7, the outer circumference of a side surface at the core member will be explained. FIG. 6 is an enlarged plan view showing part of the side surface of the core member for explaining another example of a bent part in the core member according to the present embodiment. FIG. 7 is an enlarged plan view showing part of the side surface of the core member for explaining another example of a bent part in the core member according to the present embodiment.

For example, the first electrical steel sheets 20 at the bent part 22A shown in FIG. 6 are bent with respect to the directions of extension of the first electrical steel sheets 20 at one side part 21A and the first electrical steel sheets 20 at the other side part 21A so as to have three angle parts 24A in their outer circumferences when viewed from the side surface side of the first electrical steel sheets 20. As a result, the core member 2A forms a dodecagon having 12 angle parts 24A at its outer circumference when viewed from a side surface side of the first electrical steel sheets 20. For example, in the core member 2A shown in FIG. 6, the first electrical steel sheets 20 are bent at the straight parts connecting the corner part 23A and the angle parts 24A, so the magnetic flux running through the core member 2 easily leaks at those parts. However, a stack according to the present embodiment is arranged at least at one surface of the side surfaces of the bent part 22A so that the side surfaces of the second electrical steel sheets 30 of the stack run along the side surfaces of the first electrical steel sheets 20 of the bent part 22A. For this reason, the leakage flux generated at the bent part 22A can run from one side part 21A through the stack according to the present embodiment, then run through the other side part 21A connected to the stack. As a result, it becomes possible to reduce the core loss generated at the magnetic core.

Further, for example, the core member 2B shown in FIG. 7 is comprised of the first electrical steel sheets 20 wound while being bent and is formed with a bent part 22B becoming an arc shape. The bent part 22B is a region where arc shaped first electrical steel sheets 20 are stacked. The magnetic flux running through the core member 2B easily leaks from the bent part 22B. However, a stack according to the present embodiment is arranged at least at one of the side surfaces of the bent part 22B so that the side surfaces of the second electrical steel sheets 30 of the stack run along the side surfaces of the first electrical steel sheets 20 of the bent part 22B. For this reason, the leakage flux generated at the bent part 22B can run from one side part 21B through the stack according to the present embodiment, then run through the other side part 21B connected to the stack. As a result, it becomes possible to reduce the core loss generated at the magnetic core.

Further, in this embodiment, the case where the inner circumference of the side surface at the core member was a rectangular shape was explained, but the present invention is not limited to this. The inner circumference of the side surface at the core member may be made a polygonal shape, rounded square shape, oval shape, oblong shape, etc. For example, the inner circumference of the side surface at the core member may be made a shape corresponding to the shape of the outer circumference of the side surface. For example, when the outer circumference of a side surface of the core member is octagonal, the inner circumference of the side surface can be made octagonal, while when the outer circumference of a side surface of the core member is a rounded square, the inner circumference of the side surface can be made a rounded square. The inner circumference of the side surface of the core member may also be a shape different from the outer circumference of the side surface of the core member. In this case as well, as explained before, a bent part is positioned between one side part and another side part adjoining each other and is a part where the first electrical steel sheets are stacked bent with respect to the directions of extension of the first electrical steel sheets at the one side part and the first electrical steel sheets at the other side part.

Further, in this embodiment, the case where the first electrical steel sheets forming the side parts of the core member were straight shapes was explained, but the first electrical steel sheets forming the side parts of the core member need not be straight shapes and may also be curved. In this case, it is possible to use the parts with a large curvature at the core member as the bent parts and use the parts with a small curvature as the side parts. The shape of the core member with curved side parts is, for example, circular or oval.

Further, in this embodiment, the case where the shape of a stack was a rectangular plate shape was explained, but the shape of the stack is not particularly limited. It may be made a shape corresponding to the shape of the side surface of a bent part.

Further, in this embodiment, the case where the stack was one comprised of flat sheet-shaped second electrical steel sheets stacked together was explained, but the second electrical steel sheets are not limited to flat sheets and may be curved as well. It is possible to arrange a stack formed using second electrical steel sheets curved in accordance with the shape of the stacked surfaces of the first electrical steel sheets at a bent part at a side surface of the bent part. Due to this, the stack can more effectively trap the leakage flux occurring at the bent part. As a result, it becomes possible to reduce the core loss caused more.

Further, in this embodiment, the case where a stack had through holes was explained, but the present invention is not limited to the illustration. For example, a jig for fastening a stack not having through holes to the core member may also be used. Instead of a jig, various types of existing binders may be used to adhere the stack to a side surface of the core member. If using a binder, the binder is preferably one having an insulating ability.

EXAMPLES

Below, while showing examples, the embodiments of the present invention will be explained specifically. Note that, the examples shown below are just illustrations of the present invention. The present invention is not limited to the following examples.

Thickness 0.23 mm grain-oriented electrical steel sheets were wound to fabricate a core member having bent parts at four corners. Clamping the respective four bent parts of the core member, stacks of (grain-oriented, non-oriented) electrical steel sheets stacked together were placed so that the stacked surfaces of the stacks became parallel to the stacked surfaces of the first electrical steel sheets at the bent parts to thereby manufacture a magnetic core. This magnetic core was used to manufacture a transformer.

Using the above method, as shown in Table 1, 25 kVA to 750 kVA transformers were manufactured and measured for respective core loss and for sound pressure as evaluation of noise. Table 1 shows the values of the capacities of the manufactured magnetic cores, the shapes of the core members, the total weights of the transformers, the weights of the core members 2 comprised of the first electrical steel sheets 20, the core dimensions (vertical, horizontal, stacked thicknesses, widths), core losses, noise, and the ratio $T_2/T_1$ of the thickness $T_2$ of the second electrical steel sheets 30 to the thickness $T_1$ of the first electrical steel sheets 20. Note that, the total weight of a transformer is the total weight including the case, windings, core member 2, stacks 3, etc. As comparative examples, Comparative Examples 1 to 6 in which, in the same way as the examples, thickness 0.23 mm grain-oriented electrical steel sheets were wound to prepare core members having bent parts at their four corners, but no stacks were placed to form the magnetic cores and Comparative Examples 7 and 8 where stacks were placed but $T_2/T_1$ was made 1.0 or more to form the magnetic cores were prepared as comparative examples. Further, the magnetic cores were used to manufacture transformer.

As explained above, the transformers of the examples and the transformers of the comparative examples differ in the point of the existence of the stacks. Example 1 and Comparative Example 1 feature common conditions other than the point of the existence of the stacks. Similarly, Examples 2 to 6 feature common conditions other than the point of the existence of the stacks respectively with Comparative Examples 2 to 6. Further, Comparative Examples 7 and 8 show examples made different from the examples in the ratio $T_2/T_1$ of the thickness $T_2$ of the second electrical steel sheets 30 to the thickness $T_1$ of the first electrical steel sheets 20 when providing the stacks. Example 1 and Comparative Example 7 feature common conditions other than the ratio $T_2/T_1$ of the thickness $T_2$ of the second electrical steel sheets 30 to the thickness $T_1$ of the first electrical steel sheets 20. Further, Example 6 and Comparative Example 8 feature common conditions other than the ratio $T_2/T_1$ of a thickness $T_2$ of the second electrical steel sheets 30 to the thickness $T_1$ of the first electrical steel sheets 20. Note that, in Table 1, a "rounded square" means a shape where the angle parts have no bent parts but are curved with a certain curvature, for example, the shape shown in FIG. 7. The core loss (no load loss) and sound pressure were measured based on JEC-2200.

TABLE 1

| | Capacity (kVA) | Core member shape | Transformer total weight (kg) | Core member weight of first electrical steel sheets (kg) | Core dimension Vertical (mm) | Core dimensions Horizontal (mm) | Core dimensions Stacked thickness (mm) | Core dimensions Width (mm) | Core loss (W) | Noise (dB) | T1: Thickness of first electrical steel sheets 20 T2: Thickness of second electrical steel sheets 30 T2/T1 |
|---|---|---|---|---|---|---|---|---|---|---|---|
| Ex. 1 | 25 | Octagon | 136 | 35 | 400 | 150 | 50 | 80 | 28.1 | 40.0 | 0.87 |
| Ex. 2 | 25 | Rounded square | 149 | 34 | 400 | 150 | 50 | 80 | 26.8 | 37.6 | 0.87 |
| Ex. 3 | 75 | Octagon | 321 | 95 | 400 | 200 | 50 | 200 | 72.8 | 42.6 | 0.87 |
| Ex. 4 | 100 | Octagon | 477 | 390 | 1000 | 250 | 100 | 200 | 361 | 42.5 | 0.87 |
| Ex. 5 | 300 | Octagon | 1032 | 815 | 1000 | 350 | 200 | 200 | 719 | 45.0 | 0.87 |
| Ex. 6 | 750 | Octagon | 2482 | 2003 | 1000 | 450 | 300 | 300 | 2027 | 47.2 | 0.87 |
| Comp. Ex. 1 | 25 | Octagon | 135 | 35 | 400 | 150 | 50 | 80 | 30.9 | 44.0 | — |
| Comp. Ex. 2 | 25 | Rounded square | 148 | 34 | 400 | 150 | 50 | 80 | 29.3 | 41.2 | — |
| Comp. Ex. 3 | 75 | Octagon | 320 | 95 | 400 | 200 | 50 | 200 | 81.8 | 46.3 | — |
| Comp. Ex. 4 | 100 | Octagon | 475 | 390 | 1000 | 250 | 100 | 200 | 392 | 47.6 | — |
| Comp. Ex. 5 | 300 | Octagon | 1030 | 815 | 1000 | 350 | 200 | 200 | 827 | 48.9 | — |
| Comp. Ex. 6 | 750 | Octagon | 2480 | 2003 | 1000 | 450 | 300 | 300 | 2128 | 53.0 | — |
| Comp. Ex. 7 | 25 | Octagon | 136 | 35 | 400 | 150 | 50 | 80 | 29.8 | 42.1 | 1.30 |
| Comp. Ex. 8 | 750 | Octagon | 2482 | 2003 | 1000 | 450 | 300 | 300 | 2079 | 50.3 | 1.30 |

If comparing Example 1 and Comparative Example 1, the core loss of Example 1 was 28.1 W or smaller than the core loss 30.9 W of Comparative Example 1. Further, the value of the sound pressure of Example 1 was 40.0 dB or a value smaller than the value 44.0 dB of the sound pressure of Comparative Example 1. Similarly, when comparing Example 2 to Example 6 respectively with Comparative Example 2 to Comparative Example 6, in each case, the transformer of the example was smaller in core loss and sound pressure.

Further, if comparing Example 1 and Comparative Example 7, the core loss of Example 1 was 28.1 W or smaller than the core loss 29.8 W of Comparative Example 7. Further, the value of the sound pressure of Example 1 was 40.0 dB or a value smaller than the value 42.1 dB of the sound pressure of Comparative Example 7.

Further, if comparing Example 6 and Comparative Example 8, the core loss of Example 6 was 47.2 W or smaller than the core loss 50.3 W of Comparative Example 8. Further, the value of the sound pressure of Example 6 was 47.2 dB or a value smaller than the value 50.3 dB of the sound pressure of Comparative Example 8.

Above, according to the present invention, it becomes possible to provide a magnetic core and transformer in which core loss is reduced.

Above, preferred embodiments of the present invention were explained in detail while referring to the attached drawings, but the present invention is not limited to these examples. It is clear that any person having ordinary knowledge in the field of art to which the present invention belongs could conceive of various examples of changes or examples of corrections within the scope of the technical ideas described in the claims. It will be understood that these too naturally fall in the technical scope of the present invention.

REFERENCE SIGNS LIST

1 magnetic core
2, 2A, 2B core member
20 first electrical steel sheet
21, 21A, 21B side part
22, 22A, 22B bent part
23 corner part
24 angle part
3 stack
30 second electrical steel sheet
4 jig
41 support column 41
42 fastening sheet
43 outer sheet
44 inner sheet
45 bolt
46 nut
50 strain region

The invention claimed is:

1. A magnetic core comprising a core member which has a layered structure composed of first electrical steel sheets, which has bent parts and straight parts so as to form a ring shape on a side surface of the core member, where the side surface of the core member is made up of layered edges of the first electrical steel sheets, and is perpendicular to a plane of a layered surface of the first electrical sheets, and one or more stacks, which have a layered structure composed of second electrical steel sheets, where a side surface of the stack is made up of layered edges of the second electrical steel sheets, and is perpendicular to the plane of the second electrical sheets, wherein each of the stacks covers at least one of the bent parts of the core member so that the side surface of each stacks makes a contact with the side surface of the core member, and where a direction of the edges of the second electrical steel sheets matches with a direction of the edges of the first electrical steel sheets at least at one of the bent parts on the side surface of the core member.

2. The magnetic core according to claim 1, where a direction of edges of the second electrical steel sheets and a bisector of the bent parts of the core member, makes 45 degrees or more and 90 degrees or less, where the bisector is defined as a segment which connects a midpoint of the bent parts at an outer circumference and a midpoint of the bent parts at the inner perimeter.

3. The magnetic core according to claim 1, where at least at one of outer circumference of the bent parts of the core member shows an angled shape on the side surface of the core member.

4. The magnetic core according to claim 1, where an outer circumference of the bent parts shows an octagonal shape on the side surface of the core member.

5. The magnetic core according to claim 1, where a thickness of each of the second electrical steel sheets is the same as or smaller than a thickness of each of the first electrical steel sheets.

6. The magnetic core according to claim 5, wherein the ratio of T2/T1 is 0.5 or more and 1.0 or less, where T1 and T2 are the thickness of each of the first electrical steel sheets and the thickness of each of the second electrical steel sheets, respectively.

7. The magnetic core according to claim 1, where the second electrical steel sheets are insulated from each other.

8. The magnetic core according to claim 1, where the core member is insulated from each of the stacks.

* * * * *